Dec. 15, 1953 H. E. GOLDSTINE 2,662,938

COUPLING CIRCUIT FOR USE IN CATHODE COUPLED CIRCUITS

Filed March 29, 1949

INVENTOR
Hallan E. Goldstine
BY
[signature]
ATTORNEY

Patented Dec. 15, 1953

2,662,938

UNITED STATES PATENT OFFICE 2,662,938

COUPLING CIRCUIT FOR USE IN CATHODE COUPLED CIRCUITS

Hallan E. Goldstine, Port Jefferson Station, N. Y., assignor to Radio Corporation of America, a corporation of Delaware Application March 29, 1949, Serial No. 84,158

6 Claims. (Cl. 179—171)

This invention relates to coupling circuits and more particularly to coupling circuits for use in cathode coupled circuits.

The current drawn by a tube or other multi-element translating device in the absence of an applied signal produces a direct current voltage drop across an impedance connected in series with it, and therefore when an output circuit is connected across this series impedance, a direct current potential is introduced into the output circuit. Generally, the end of the series impedance not directly tied to the lowest potential element of the translating device is at ground potential and the opposite end is at a higher potential.

It is desirable under most circumstances to isolate this direct current potential from the output circuit, and this is customarily accomplished by the introduction of a blocking condenser in series with the lead connected to the high potential end of the series impedance. The principal disadvantage of this type of isolation of the direct current or potential from the output circuit is that low frequency attenuation and phase shift of the alternating current signals is introduced. Although this is avoided to some extent by use of a sufficiently large blocking condenser, such an arrangement becomes both impractical and expensive when audio frequencies are involved or when video signals are being transmitted and high fidelity is required.

According to this invention, the blocking condenser is eliminated, and the consequent attenuation and phase shift are reduced to zero. This is accomplished by causing a direct current to flow through the impedance that is equal and opposite to the quiescent current—i. e., the direct current component in the impedance drawn by the tube or transducer when no signal is present and thereby reducing the voltage across the impedance to zero. Therefore, if one end of the impedance is at ground potential the other end is at zero D. C. potential with respect to ground.

It is a primary object of this invention to couple the output of a multi-element transducer so as to maintain the output circuit at current ground potential without the use of a blocking condenser.

It is a further purpose to couple a plurality of multi-element amplifiers in such manner that the output circuit is maintained at direct current ground potential without the use of a blocking condenser.

It is still a further purpose to couple a plurality of multi-element amplifiers in such manner that the output circuit is maintained at direct current ground potential without attenuating or shifting the phase of the alternating currents present therein.

Another purpose of this invention is to eliminate attenuation and phase change in a coupling circuit.

Further advantages will be apparent upon consideration of the specific embodiment of principles of the invention shown in the drawings in which.

Figures 1, 2, 3:
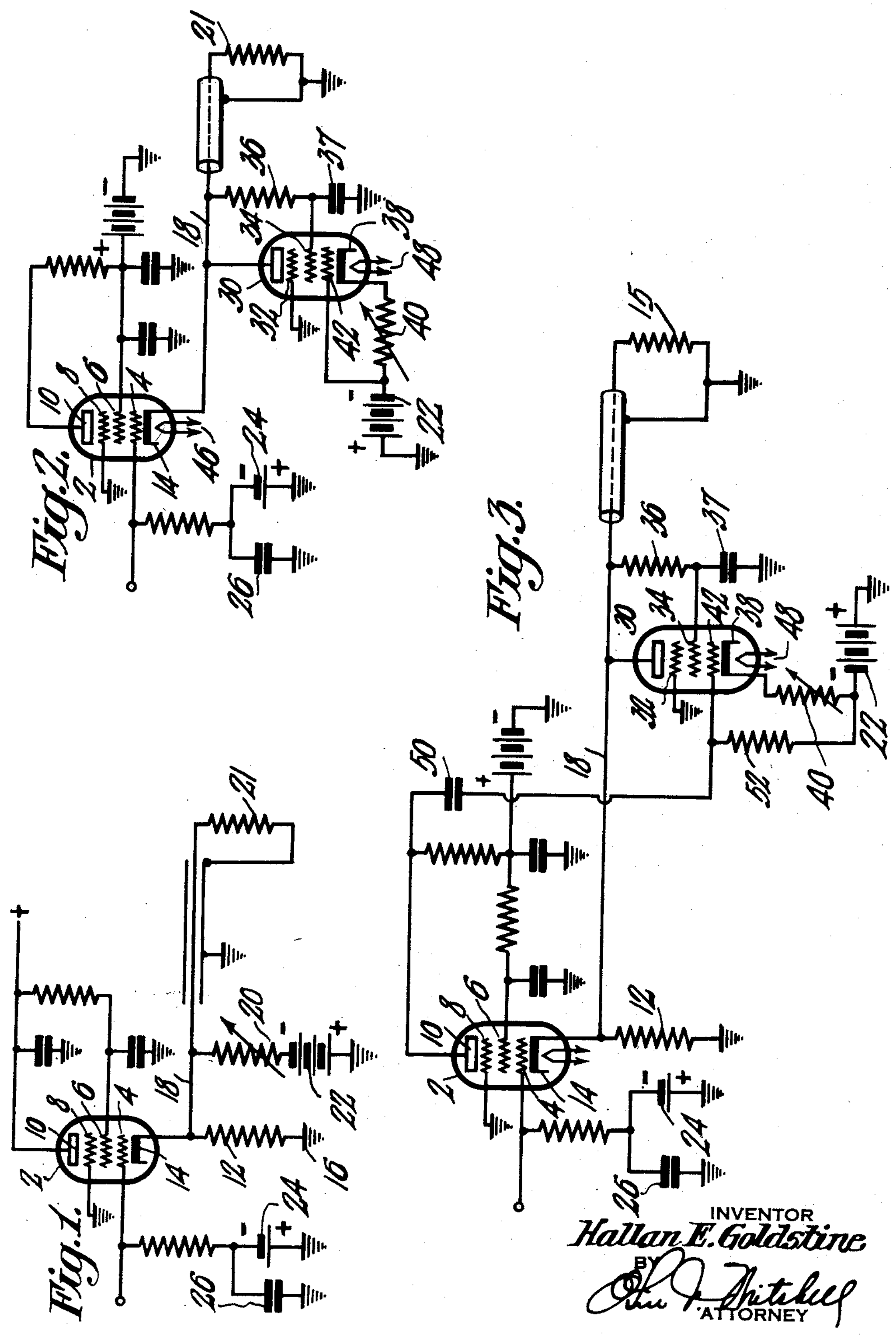
Figure 1 shows a coupled amplifier in which both terminals of the output circuit are maintained at direct current ground by the use of an additional direct current source.
Figure 2 shows a coupled amplifier in which the output circuit is maintained at direct current ground by use of an electron control device.
Figure 3 shows a coupled amplifier in which the output circuit is maintained at direct current ground potential and at the same time the alternating current signal is amplified.

Referring now to the drawing, there is shown in Figure 1 for the purpose of illustration an electron tube 2, having a control grid 4, a screen grid 6, a suppressor grid 8, and a plate 10, that is connected directly to a source of positive potential. A load resistor 12, is connected between the cathode 14 and ground 16, the output connection 18 being connected directly to the cathode 14. In parallel with the load resistor 12 is another resistor 20 and a source of direct current potential 22, the latter being connected so that its positive terminal is connected to ground.

In the absence of signals on control grid 4, the tube 2 draws a certain amount of direct current in such a direction that the cathode 14 would normally be positive with respect to ground. When resistance 20 and the source of potential 22 are included in the circuit in accordance with the present invention, the potential at the cathode 14 can be made to correspond to ground potential, provided the values of the resistance 20 and source of potential are properly chosen.

The value of the resistance 12, in combination with resistor 20, may be chosen to match the impedance of the output circuit (such as a coaxial cable), and the resistance 20 is preferably chosen to have a resistance higher than that of resistance 12. It should be noted that the same results are achieved and the power output increased if resistor 12 is eliminated, its function carried out by resistor 21 but the use of such modification depends partly on the length of output connector 18.

To make the potential of the cathode 14 correspond to direct current ground potential, however, the resistance 20 and source of potential 22 must be chosen so that the current induced in resistors 12 and 21, by source 22, is equal and opposite to the portion of the total tube current that passes through said resistors. The sum of the voltage drops in resistors 12 and 20, or in resistors 21 and 20, due to the respective loop currents must equal the voltage of the source 22 and since the space current drawn by the tube is proportioned among the parallel resistors 12, 21 and 20, in inverse relation to their value, the drop across resistor 20 equals the voltage of source 22, and thus the output line 18 is at direct current ground potential.

In order to afford a bias potential for tube 2 to permit operation at the desired region of its characteristic curve a source of biasing potential 24 (by-passed by a condenser 26), may be included in the control grid-cathode circuit of the tube.

Another circuit embodying the same principles is illustrated in Figure 2, and like parts being indicated by the numbers used in Figure 1. The modification consists in the replacement of resistor 20 of Figure 1 with a vacuum tube 30, that is preferably a pentode or a multi-element amplifier that offers high impedance to video frequency voltage impressed on the plate circuit having a plate 32 directly connected to output lead 18, a grounded suppressor grid 32, a screen grid 34, having a screen load resistor 36, and filter condenser 37, connected thereto, a cathode 38 having a variable resistor 40, and a source of direct current potential 22, connected in series between it and ground so as to complete the loops including resistors 12 and 21. The grid 42 is biased by means of an adjustable cathode resistor 40. In theory this circuit operates the same as that shown in Figure 1, but has the advantage of maintaining the output lead 18 at direct current ground potential during the warming period that follows energization of the equipment for the reason that tubes 2 and 30 have the same time constant in the heaters 46 and 48 respectively. A further advantage is derived from the fact that the tube 30 does not consume any appreciable power from the video signals because of its high impedance, but at the same time very little direct current voltage is required to produce the required amount of direct current in the loops. As pointed out above increased power output is obtained by the elimination of resistor 12, resistor 21 performing its function.

Figure 3 illustrates a modification of the circuit arrangement shown in Figure 2, whereby the video output signals of the multi-element translating device 2, are applied to the grid 42, via coupling condenser 50, and resistor 52, thereby using the electronic device 30 as an amplifier for the video signals, as well as for maintaining the output lead 18 at direct current ground.

The resistor 12 may be eliminated as it was in Figure 2.

Whereas the specific illustrations of the invention have involved the use of standard vacuum tubes it is contemplated that the principles of the invention can be applied to any type of amplifier in which electric currents are involved.

Although the circuit has been shown and described in connection with a video amplifier circuit, it is intended that it is to be used in any cathode coupled circuit such as a cathode follower to eliminate attenuation and phase shift of low frequency signals generally encountered in the normal cathode coupling circuit.

Having thus described the invention, what is claimed is:

1. A coupling circuit having an output lead maintained at a fixed potential comprising an electron control device having at least one output element, at least one bilateral impedance connected between ground and the output element of said control device having the lowest direct potential, an output lead connected at the junction of said bilateral impedance and said element, a controllable unilateral impedance having a control element, said unilateral impedance being connected in parallel with said bilateral impedance so as to pass current from ground to said junction, a variable impedance and a source of electromotive force connected in series with said unilateral impedance and ground, said source being of such polarity and magnitude as to cause a direct current to flow through said bilateral impedance of equal magnitude and opposite in polarity to the current induced in said bilateral impedance by said electron control device.

2. A coupling circuit such as described in claim 1, in which the unilateral impedance is an electronic amplifier, and a higher potential output element of said electron control device is coupled to the control element of said unilateral impedance.

3. A combination coupling and amplifying circuit that maintains its output lead at direct potential comprising a first electronic amplifier having at least a plate, a grid and a cathode, a source of direct current potential connected to said plate, a resistor connected between the cathode and ground, a second electronic amplifier, a variable impedance and a source of potential connected in series between said cathode and ground, the value of said impedance and said potential being so chosen as to cause a current to flow in said resistor that is opposite in polarity and equal in magnitude to the current drawn through said resistor by said first electronic amplifier in the absence of an applied signal, a coupling network connected between the plate of said first amplifier and the grid of said second amplifier, and an output lead connected to the cathode of said first amplifier.

4. A first amplifier having an input and an output, an impedance connected in series with said amplifier and a first source of fixed direct potential, the polarity of said source being such as to cause current to flow in one direction through said impedance and said amplifier, a second amplifier having an input and an output, a second source of direct potential, said second amplifier and said second source being connected in series parallel relationship with said impedance, the polarity and magnitude of said second source being such that the quiescent current of said second amplifier substantially counteracts the quiescent current drawn by said first amplifier, and the input of said second amplifier being connected to the output of said first amplifier so as to amplify signals presented to the input of said first amplifier.

5. A first amplifier having at least a plate, a grid and a cathode, a first source of fixed direct potential, an impedance connected between said source and the cathode so that a given amount of direct current is drawn through said impedance, a second amplifier having at least a plate, a grid and a cathode, the plate of the second amplifier being connected to the cathode of the first, a second source of direct potential, said second source being connected between the cathode of said second amplifier and the first source of fixed direct potential so as to cause a quiescent current in said second amplifier that flows through said impedance in a direction that is opposite and equal to the quiescent current caused to flow in said impedance by the first amplifier, the plate of the first amplifier being coupled to the grid of the second amplifier whereby signals applied to the grid of the first amplifier are amplified and added in an inphase relationship to the signal voltages appearing across the impedance caused by the first amplifier.

6. An electronic circuit comprising a multi-element amplifier having a cathode and a plate, an impedance connected between a fixed potential and the cathode of said amplifier, a source of voltage applied to said plate so as to tend to cause a direct current to flow through said impedance, an output lead connected to said cathode, a source of direct current connected in parallel with said impedance, the current supplied by said source being such that it is equal and opposite to the direct current in said impedance caused by said amplifier in the absence of an applied signal, said source of direct current having a high impedance to video signals.

HALLAN E. GOLDSTINE.

References Cited in the file of this patent

UNITED STATES PATENTS

| Number | Name | Date |
|---|---|---|
| 1,926,568 | Walz | Sept. 12, 1933 |
| 2,310,342 | Artzt | Feb. 9, 1943 |
| 2,358,428 | White | Sept. 19, 1944 |
| 2,430,699 | Berkoff | Nov. 11, 1947 |
| 2,431,973 | White | Dec. 2, 1947 |

OTHER REFERENCES

"Text Vacuum Tube Voltmeters," Rider; John F. Rider Publisher, Inc., 1941. Eleventh printing October 1945, pages 35 through 38 (Figure 3.3).